Figure 1:
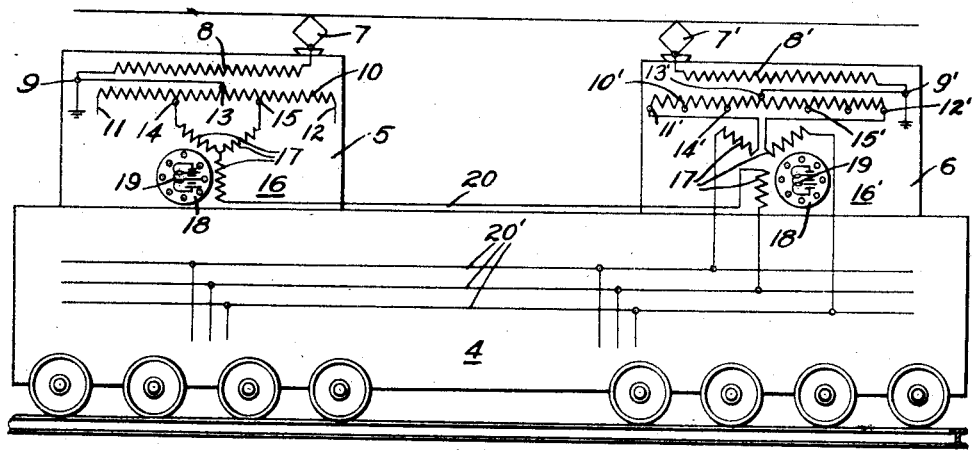

Jan. 15, 1924.

C. LE G. FORTESCUE 1,480,715

PHASE CONVERTER SYSTEM

Filed April 27, 1922   3 Sheets-Sheet 1

WITNESSES:

INVENTOR
Charles Le G. Fortescue
BY
ATTORNEY

Jan. 15, 1924.

C. LE G. FORTESCUE 1,480,715

PHASE CONVERTER SYSTEM

Filed April 27, 1922

3 Sheets-Sheet 2

WITNESSES:

INVENTOR
Charles LeG. Fortescue
BY
ATTORNEY

Jan. 15, 1924.  1,480,715
C. LE G. FORTESCUE
PHASE CONVERTER SYSTEM
Filed April 27, 1922   3 Sheets-Sheet 3

WITNESSES:

INVENTOR
Charles Le G. Fortescue.
BY
ATTORNEY

Patented Jan. 15, 1924.

1,480,715

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

PHASE-CONVERTER SYSTEM.

Application filed April 27, 1922. Serial No. 556,858.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Phase-Converter Systems, of which the following is a specification.

My invention relates to methods and means for transferring energy between single-phase and polyphase circuits and has particular reference to systems employing dynamo-electric machinery for phase conversion.

It is well known that a phase converter may be connected with one of its phases in shunt to a single-phase line. Such a phase converter may be over-excited to supply any amount of wattless current to the single-phase and polyphase lines, but the polyphase voltages will be unbalanced on account of the internal impedance drops in the machine. On the other hand, a phase converter may be connected with its several primary windings in series with the polyphase lines to permit the flow of only balanced polyphase currents, whereby the polyphase lines may be perfectly balanced, but any wattless current drawn by the series phase balancer operates to destroy the phase balance.

In railway locomotive service where single-phase power is received through a current collector and converted, in the locomotive, into polyphase power, it is desirable to have the converting apparatus in duplicate so that, in case of a lightning discharge or other accident incapacitating one phase-converting machine, the locomotive will not be altogether powerless.

In accordance with the considerations just mentioned, I have devised a phase-converting system particularly adapted for locomotive service, employing two interchangeable phase-converter machines each supplying one-half of the tertiary voltage necessary to effect the phase conversion, one of the phase converters being connected in shunt and over-excited for power-factor correction and the other being connected in series and so excited as to supply no wattless currents, whereby substantially perfect phase balancing is obtained.

More generally stated, an object of my invention is to provide an arrangement wherein a shunt converter is employed to supply a part of the phase conversion and a series converter is employed to complete the phase conversion.

A still further object of my invention is to provide a phase-converting system wherein a shunt converter is employed to supply wattless currents while a series converter is employed to perfect the balancing operation.

Figure 2:
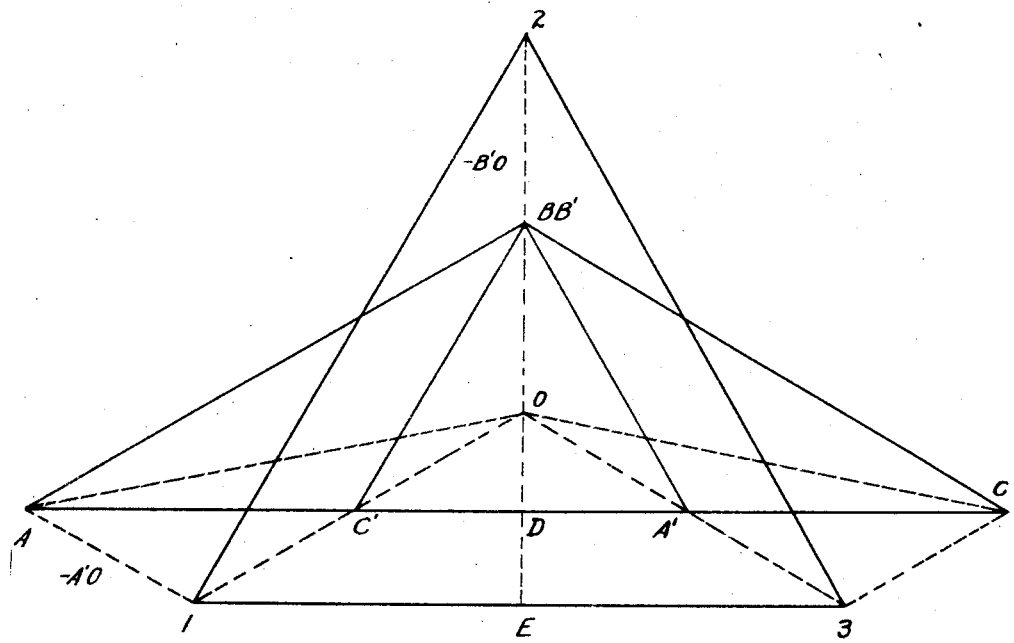
Figure 3:
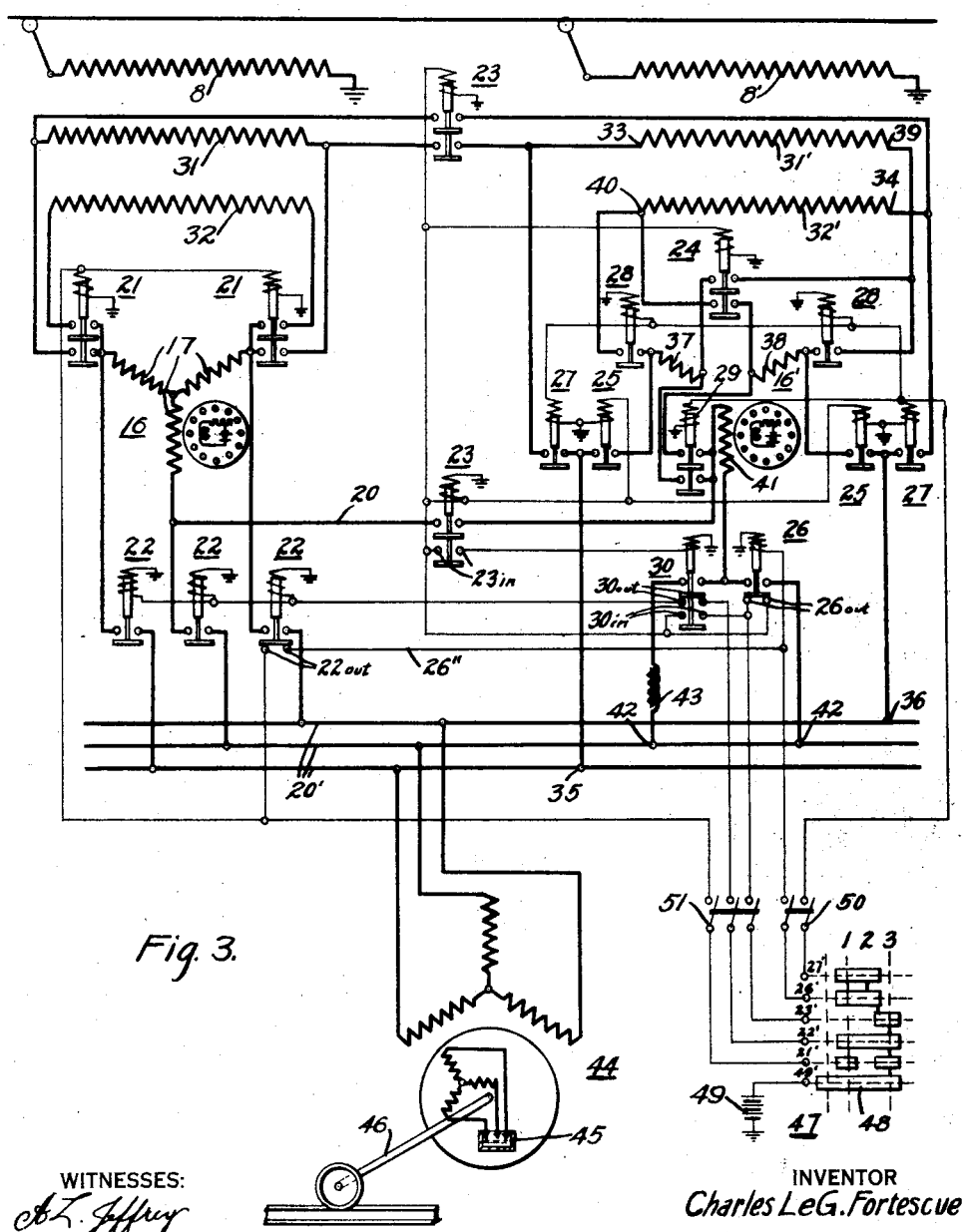

With these and other objects in view, my invention consists in the methods and arrangements described in the following specification and illustrated in the accompanying drawing, wherein:

Fig. 1 is a diagrammatic illustration of a locomotive with apparatus and circuits embodying the preferred form of my invention, Fig. 2 is a vector diagram illustrating the several voltage relationships, Fig. 3 is a diagrammatic view of a modification, and Figs. 4 to 10 are views showing the various circuit connections throughout the system of operation of the modification shown in Fig. 3.

In Fig. 1 is shown a railway locomotive 4 having two cabs 5 and 6. The cab 5 is provided with a current-collector 7 which is connected, through a primary transformer winding 8, to ground at 9. A secondary transformer winding 10 is provided having end terminals 11 and 12, a mid-tap 13 and intermediate taps 14 and 15, said intermediate taps being symmetrically disposed with respect to the mid tap and embracing substantially one-third of the total number of turns of the secondary winding 10. The cab 6 is similarly provided with a current-collector 7', a primary transformer winding 8' and a ground connection 9', together with a secondary transformer winding 10' having the taps 11', 14', 13', 15' and 12'. The mid taps 13 and 13' may be grounded as indicated.

A pair of interchangeable dynamo-electric phase converters 16 and 16' are provided, each of said dynamo-electric converters being provided with three-phase primary windings 17, low-impedance damper windings 18 and unidirectional exciting windings 19. The converter 16 has two of its primary terminals connected to the low-voltage taps 14, 15 of the transformer secondary winding 10, the remaining primary phase terminal providing a tertiary electromotive force which is supplied to the second phase converter 16' through a connecting conductor 20. The second converter 16' is connected with its three primary windings in series between a three-phase supply line 20' on the one end and the tertiary conductor 20 and the terminal transformer taps 11' and 12' on the other end. The three-phase supply line 20' is utilized to energize the propulsion motors, as will be understood.

The series converter 16' has the property of permitting the flow of only balanced polyphase currents provided it is excited with just the amount necessary to generate a voltage equal and opposite to the symmetrical component of reverse-phase-sequence electromotive force in the unbalanced polyphase lines and provided that the mechanical or no-load losses are supplied from an external source. As the last mentioned losses are relatively small, no means has been shown in the drawing for supplying such losses, such means relating to the specific design and operation of the series phase converter per se and forming the subject-matter of an application filed Oct. 17, 1918, by Stuart H. Cowin, Serial No. 258,581, and assigned to the Westinghouse Electric & Manufacturing Company.

On the other hand, the shunt balancer 16 is able to supply any amount of wattless current within the capacity of the machine without materially affecting the perfection of the phase balance, but the phase balancing is never perfect on account of the inevitable internal impedance drops within the machine. By employing both machines and causing each machine to perform one-half of the phase-balancing operation, interchangeable machines may be employed whereby, in case of the burning out of either machine, the other machine may be utilized to supply three-phase power in order to enable the locomotive to reach a substation, while, when both phase converters are employed, substantially perfect phase balancing, with power factor correction, may be obtained.

Fig. 2 shows the vector relationships of the phase-balancing operation. The voltages of the end and intermediate taps of the transformer secondary are indicated at AC'A'C. The shunt converter 16, which is supplied with a single-phase voltage C'A', develops a tertiary voltage DB' which is substantially 0.866 of the base C'A', or 0.289 of the base AC, thus providing a substantially balanced polyphase system A'B'C', neglecting, for simplicity, the internal impedance losses. The series converter 16' is impressed with an unsymmetrical polyphase voltage ABC which is composed of the single-phase voltage AC and the tertiary voltage BD which is identical with voltage B'D.

The unbalanced delta voltages ABC may be represented by the star voltages OA, OB and OC which may be resolved into two symmetrical component systems of opposite phase sequence, namely, a major, forwardly-rotating symmetrical component O—1, O—2 and O—3, and a minor, backwardly-rotating symmetrical component A'O, B'O, and C'O, as indicated in the drawing. It will be noted that the forwardly rotating symmetrical component 1—2—3 has a voltage 1—3 in phase with the single-phase transformer voltage and just double the voltage C'A' of the intermediate taps, and having a total tertiary voltage E—2 which is just double the tertiary voltage DB' which is supplied by the shunt converter. Thus, it is seen that each converter performs one-half of the work necessary to transform the single-phase power into the three-phase power.

Fig. 3 shows a modified embodiment employing a plurality of electromagnetic switches 21 to 30, inclusive, for controlling the connections of the phase converters. In the modification just referred to, the primary windings 8 and 8' of the single-phase transformers are each associated with a pair of secondary windings 31, 32 and 31', 32', the secondary windings being all equal in size. Two terminals of the primary winding 17 of the shunt converter 16 are connected to the single-phase windings 31 and 32 through the switches 21. The three terminals of the primary winding are also connected to the polyphase line 20' through the switches 22.

One terminal of the transformer winding 31 is connected, through a switch 23, to one terminal 33 of the winding 31', and the other terminal of the winding 31 is connected, through the switch 23, to one terminal 34 of the winding 32', in such manner that the windings 31' and 32' constitute, in effect, extensions of the winding 31'. Two terminals 35 and 36 of the polyphase line 20' are connected, through the switches 25, respectively, to the outer terminals of two phases 37 and 38 of the primary winding 17' of the series machine 16'. The terminals 35 and 36 are also connected, through the switches 27, respectively, to the terminals 33 and 34 of the transformer windings. The inner terminal of the winding 37 is connected, through the switch 24, to the remaining terminal 39 of the transformer winding 31', and the inner terminal of the winding 38 is similarly connected, through the switch 24, to the remaining terminal 40 of the transformer winding 32'. The outer terminals of the windings 37 and 38 are also connected, through the switches 28, to the terminals 40 and 39, respectively.

The tertiary winding of the primary member 17 of the shunt machine is connected, by means of the conductor 20 and a switch 23, to the inner terminal of the remaining winding 41 of the primary member 17' of the series machine. The inner terminal of the winding 41 is also connected, through the switch 29, to the inner terminals of the windings 37 and 38, respectively.

The outer terminal of the winding 41 is connected, through the switch 26, to the corresponding terminal 42 of the polyphase line 20', and said outer terminal of the winding 41 is further connected, through a current-limiting impedance device 43 and the switch 30, to said terminal 42.

The polyphase line 20' is utilized as a source of supply for an induction motor 44, which may have a water rheostat 45 in its secondary circuit and may be mounted on the driving axle 46 of a locomotive.

The system disclosed in Fig. 3 is designed to operate the motor 44 at either one of two voltages. The lower voltage is obtained by operating the shunt and series converting machines in parallel or by operating the series machine alone, and the higher voltage is obtained by employing a connection equivalent to that shown in Fig. 1.

I have shown a drum controller 47 comprising a movable contact member 48 and a series of stationary contacts 27', 26', 23', 22', 21', and 49' for appropriately energizing the correspondingly numbered switches from the battery 49. In order to simplify the controller connections, I have omitted all means for controlling the primary or secondary motor connections for additional transition speeds and I have also omitted means for controlling the direct-current excitation of the phase-converter machines.

Figures 4, 5:
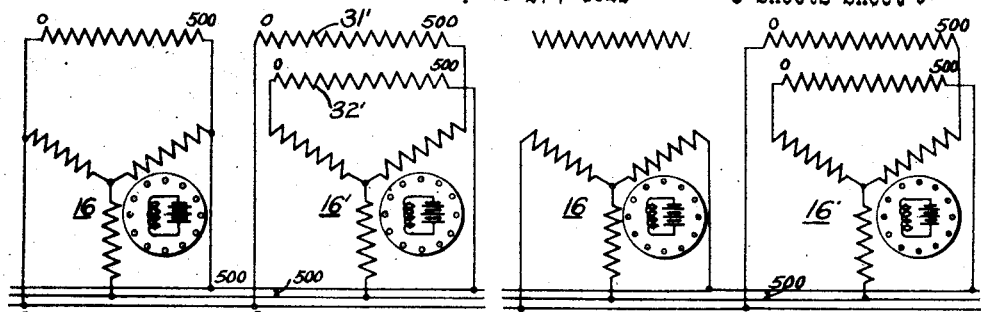

In the first position of the controller, the contacts 21', 22', 26' and 27' are energized, thus energizing the correspondingly numbered switches and also the switches 28 and 29, which are permanently connected in shunt with the switches 27. A simplified diagram of the resultant connections is shown in Fig. 4 and the resultant voltages are indicated, assuming 500 volts to be the voltage of the individual transformer sections. It will be noted that the machine 16 is operating as a shunt converter supplying a polyphase line having 500 volts delta and the machine 16' is connected in series between the same polyphase line and the single-phase transformer sections 31' and 32', whereby the two machines operate in parallel to supply power to the polyphase load.

When the propulsion motor or motors have been accelerated, in any approved manner, as by manipulation of the secondary rheostat 45, the connections between the shunt machine and the single-phase line may be broken, as indicated in Fig. 5, and the shunt machine may then be operated as a combined shunt phase balancer and synchronous condenser operating on the polyphase line 20'. To this end, the controller is moved to the second position, in which the contacts are the same as in the first position, except that the contact 21' is de-energized.

If, now, it is desired to impress the propulsion motor with a higher voltage, the controller is moved to the third position. It will be noted that, in passing from the second to the third positions, all of the contact members are momentarily energized, thus restoring the connections of Fig. 4, while, in the final position of the controller, the contacts 26' and 27' are de-energizing, leaving the contacts 21', 22' and 23' energized. Contact 23 is connected, through an interlock 26—"out", to switches 23, 24 and 25, connected in parallel. By means of the interlock 26—"out", the switches 23 to 25 are not energized until the switches 26 to 29 have become de-energized, leaving the shunt machine 16 momentarily supplying power to the polyphase mains alone, with the series machine 17' entirely disconnected from both the single-phase and the polyphase systems, as indicated in Fig. 6.

Figures 6, 7:
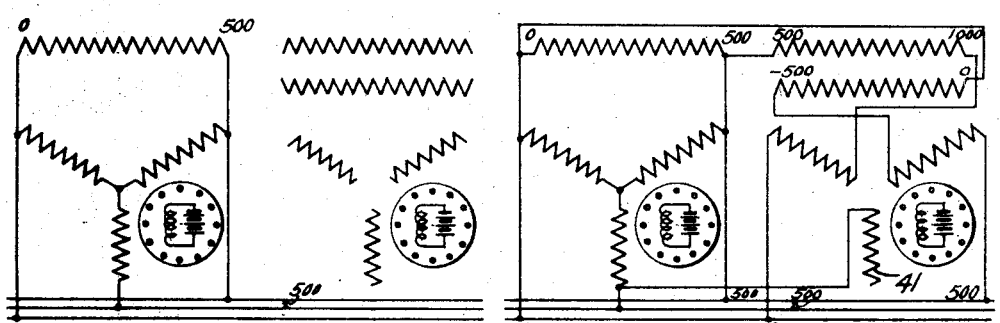
Figures 8, 9:
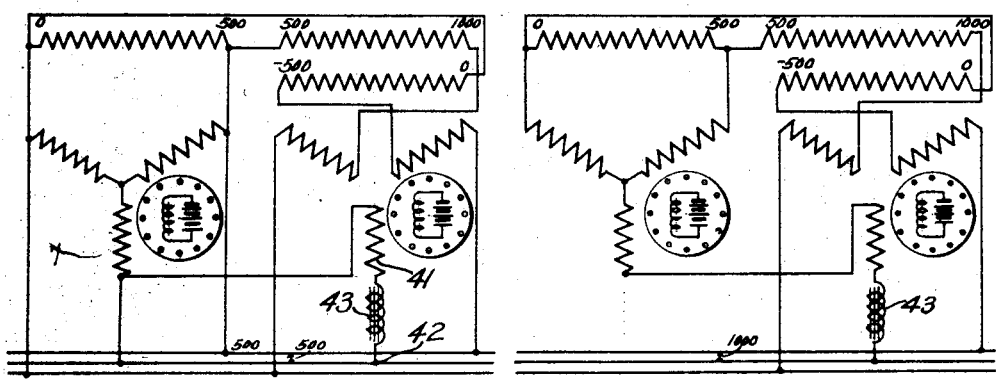

Upon the closing of the interlock 26—"out", the switches 23 to 25 are energized, producing the connection shown in Fig. 7, in which the series machine has two of its phases floating on the 500-volt polyphase lines drawing only small magnetizing currents. When switch 23 closes, an interlock 23—"in" is closed, thereby energizing the switch 30, which connects the tertiary phase 41 of the series machine to the polyphase line terminal 42 through the impedance device 43, as indicated in Fig. 8. This momentarily short-circuits the tertiary phase 41 through the impedance device 43, while the polyphase line still has impressed thereon 500 volts from the shunt converter connection.

As soon as the switch 30 is closed, however, an interlock 30—"out", which is connected in series with the contact 22', de-energizes the switches 22, producing the series connections shown in Fig. 9, in which the polyphase line is impressed with 1,000 volts delta, the voltages being distorted, however, by reason of the impedance device 43.

Figure 10:
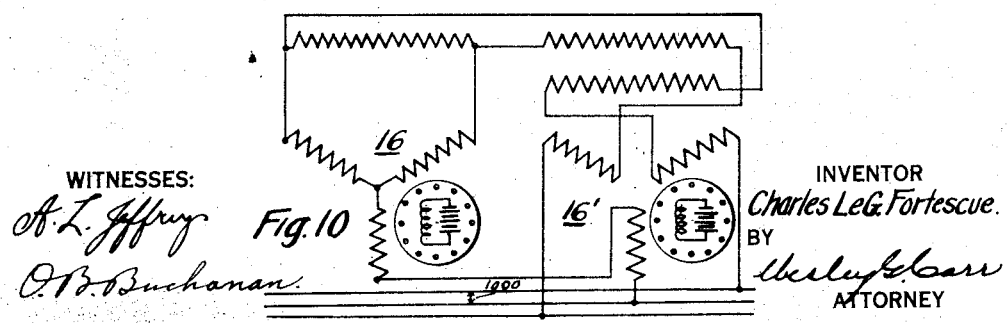

The de-energization of the switches 22 energizes an interlock 22—"out" to re-energize the switch 26 through an auxiliary supply line 26", and the current-limiting impedance device 43 is thus short-circuited, producing the final series connection shown in Fig. 10. It will be noted that the interlock 26—"out" is shunted by an interlock 30—"in," thus preventing the opening of the switches 23 to 25 when the switch 26 is re-closed under the conditions just mentioned.

By the means just described, I have provided a system in which the polyphase motors 44 may be operated either on the low-voltage energization corresponding to the triangle A'B'C' in Fig. 2, or on the high-voltage energization corresponding to the triangle 1, 2, 3 of the same figure. In case of damage to the series machine 16', a two-pole switch 50 may be opened to de-energize the contact members 26' and 27' and the controller 47 may be moved only to its first position, whereby only the shunt machine 16 is utilized in the combination shown in Fig. 4. In like manner, if the shunt machine 16 should become disabled, a three-pole switch 51 may be opened, disconnecting the contacts 21' to 23', whereby only the series machine 16' may be utilized in the connection shown in Fig. 4.

While I have shown my device as applied to a motor having a secondary rheostat, it is to be understood that the invention is equally applicable to other types of motors.

While I have described certain characteristics of my invention in detail, and while I have pointed out certain of the most obvious principles and purposes thereof, I do not intend that the language employed in the following claims shall be limited to the precise features described, but I intend that the claims shall be construed to cover all modifications which are fairly comprehended by the language thereof, when read in connection with the prior art, regardless of the details and functions mentioned in the description or illustrated in the drawing.

I claim as my invention:

1. The combination with a single-phase system, of a polyphase system, means coupled to the single-phase system for providing relatively low-voltage connections and relatively high-voltage connections, and means for interconnecting said systems for interchange of power, said interconnecting means comprising two dynamo-electric phase converters, means for connecting one of said converters in shunt to said relatively low-voltage connections and means for connecting the other converter in series between the polyphase system, on the one hand, and the relatively high-voltage connections and said shunt converter, on the other hand.

2. The combination with a single-phase system, of a polyphase system, means coupled to the single-phase system for providing relatively low-voltage connections and relatively high-voltage connections, and means for interconnecting said systems for interchange of power, said interconnecting means comprising two dynamo-electric phase converters, means for connecting one of said converters in shunt to said relatively low-voltage connections, means for connecting the other converter in series between the polyphase system, on the one hand, and the relatively high-voltage connections and said shunt converter, on the other hand, and means for causing the shunt converter to carry leading wattless currents.

3. The combination with a single-phase system and a substantially balanced three-phase system, of means coupled to the single-phase system for providing relatively low-voltage connections and relatively high-voltage connections, a pair of dynamo-electric phase converters, each of said converters having a three-phase winding and a relatively rotatable low-impedance polyaxially closed-circuiting winding, means for connecting two phase terminals of one of said converters in shunt to said relatively low-voltage connections, conductors connecting said three-phase system to said relatively high-voltage connections and to the remaining phase terminal of said shunt-connected converter and means for associating the remaining converter in series-circuit relation to said conductors.

4. The combination with a single-phase system and a substantially balanced three-phase system, of means coupled to the single-phase system for providing relatively low-voltage connections and relatively high-voltage connections, a pair of dynamo-electric phase converters, each of said converters having a three-phase winding and a relatively rotatable low-impedance polyaxially closed-circuited winding, means for connecting two phase terminals of one of said converters in shunt to said relatively low-voltage connections, conductors connecting said three-phase system to said relatively high-voltage connections and to the remaining phase-terminal of said shunt-connected converter, means for associating the remaining converter in series-circuit relation to said conductors and means for causing the shunt converter to carry leading wattless currents.

5. The combination with a single-phase system and a substantially balanced three-phase system, of phase converter means for providing an unbalanced three-phase system and for interconnecting the same for interchange of power with said single-phase system and with said balanced three-phase system, respectively, said unbalanced three-phase system having substantially an isosceles triangular polygon of electromotive forces in which the altitude is substantially 0.289 of the base.

6. In combination, a single-phase system, a substantially balanced polyphase system having one phase directly connected to said single-phase system and having a tertiary component electromotive force at substantially right angles to the single-phase electromotive force in said first-mentioned phase, and phase-converter means for providing an unbalanced polyphase system and for interconnecting the same for interchange of power with said single-phase system and with said balanced polyphase system respectively, said unbalanced polyphase system having, in effect, a tertiary component approximately half as large as said balanced system.

7. In combination, a single-phase system, a polyphase system, means coupled to the single-phase system for providing relatively high-voltage connections and also providing relatively low-voltage connections having an electromotive force which is substantially one-third of that of the high-voltage connections, said high and low-voltage connections having a substantially common mid-point potential, a pair of substantially identical dynamo-electric phase converters, means for connecting one of said converters in shunt to said relatively low-voltage connections and means for connecting the other converter in series between the polyphase system, on the one hand, and the relatively high-voltage connections and said shunt converter, on the other hand.

8. In combination, a single-phase system, a polyphase system, means coupled to the single-phase system for providing relatively high-voltage connections and also providing relatively low voltage connections having an electromotive force which is substantially one-third of that of the high-voltage connections, said high and low-voltage connections having a substantially common mid-point potential, a pair of substantially identical dynamo-electric phase converters, means for connecting one of said converters in shunt to said relatively low voltage connections, means for connecting the other converter in series between the polyphase system, on the one hand, and the relatively high-voltage connections and said shunt converter, on the other hand, and unidirectional exciting means for said converters.

9. In combination, a single-phase system, a substantially balanced three-phase system, means coupled to the single-phase system for providing relatively high-voltage connections and also providing relatively low-voltage connections having an electromotive force which is substantially one-third of that of the high-voltage connections, said high and low-voltage connections having a substantially common mid-point potential, a pair of substantially indentical dynamo-electric phase-converter means for providing an unbalanced three-phase system and for interconnecting the same for interchange of power with said single-phase system and with said balanced three-phase system, respectively, said unbalanced three-phase system having a triangular polygon of electromotive forces in which the altitude is substantially 0.289 of the base.

10. In combination, a single-phase system, a substantially balanced three-phase system, means coupled to the single-phase system for providing relatively high-voltage connections and also providing relatively low-voltage connections having an electromotive force which is substantially one-third of that of the high-voltage connections, said high and low-voltage connections having a substantially common mid-point potential, a pair of substantially identical dynamo-electric phase-converter means for providing an unbalanced three-phase system and for interconnecting the same for interchange of power with said single-phase system and with said unbalanced three-phase system, respectively, said unbalanced three-phase system having a triangular polygon of electromotive forces in which the altitude is substantially 0.289 of the base and unidirectional exciting means for said converters.

11. In combination, a single-phase system, a substantially balanced polyphase system which may be derived from the single-phase system through the intermediary of a tertiary electromotive force in quadrature relation to the single-phase electromotive force, means coupled to the single-phase system for providing relatively high-voltage connections and also providing relatively low-voltage connections having an electromotive force which is substantially one-third of that of the high-voltage connections, said high and low-voltage connections having a substantially common mid-point potential, a pair of dynamo-electric phase-converters, each of said converters having a primary winding, a tertiary winding and a low-impedance polyaxially closed-circuited secondary winding, means for connecting the primary winding of one of said converters in shunt to said relatively low-voltage connections, conductors connecting said polyphase system to said relatively high-voltage connections and to the tertiary winding of said shunt-connected converter and means for associating the remaining converter in series circuit relation to said conductors.

12. In combination, a single-phase system, a substantially balanced polyphase system which may be derived from the single-phase system through the intermediary of a tertiary electromotive force in quadrature relation to the single-phase electromotive force, means coupled to the single-phase system for providing relatively high-voltage connections and also providing relatively low-voltage connections having an electromotive force which is substantially one-third of that of the high-voltage connections, said high and low-voltage connections having a substantially common mid-point potential, a pair of dynamo-electric phase-converters, each of said converters having a primary winding, a tertiary winding and a low-impedance polyaxially closed-circuited secondary winding, means for connecting the primary winding of one of said converters in shunt to said relatively low-voltage connections, conductors connecting said polyphase system to said relatively high-voltage connections and to the tertiary winding of said shunt connected converter, means for associating the remaining converter in series-circuit relation to said conductors, and unidirectional exciting means for said shunt-connected converter.

13. The combination with a single-phase system and a substantially balanced polyphase system which may be derived from the single-phase system through the intermediary of a tertiary electromotive force in quadrature relation to the single-phase electromotive force, of means coupled to the single-phase system for providing relatively high-voltage connections and also providing relatively low-voltage connections, a pair of dynamo-electric phase converters, each of said converters having a primary winding, a tertiary winding and a low-impedance polyaxially closed-circuited secondary winding, means for connecting the primary winding of one of said converters in shunt to said relatively low-voltage connections, conductors connecting said polyphase system to said relatively high-voltage connections and to the tertiary winding of said shunt-connected converter and means for associating the remaining converter in series-circuit relation to said conductors, the relation between the single-phase electromotive forces of said relatively high and low-voltage connections being such that substantially one-half of the total tertiary electromotive force is developed in each of the converters.

14. The combination with a single-phase system and a substantially balanced polyphase system which may be derived from the single-phase system through the intermediary of a tertiary electromotive force in quadrature relation to the single-phase electromotive force, of means coupled to the single-phase system for providing relatively high-voltage connections and also providing relatively low-voltage connections, a pair of dynamo-electric phase converters, each of said converters having a primary winding, a tertiary winding and a low-impedance polyaxially closed-circuited secondary winding, means for connecting the primary winding of one of said converters in shunt to said relatively low-voltage connections, conductors connecting said polyphase system to said relatively high-voltage connections and to the tertiary winding of said shunt-connected converter, means for associating the remaining converter in series-circuit relation to said conductors, the relation between the single-phase electromotive forces of said relatively high and low-voltage connections being such that substantially one-half of the total tertiary electromotive force is developed in each of the converters, and unidirectional exciting means for said shunt-connected converter.

15. The method of operating a phase-converting system embodying shunt and series phase-converting machines, which consists in utilizing said shunt machine to perform materially less than the whole of the phase-converting operation under all load conditions and utilizing said series machine to complete the phase-converting operation.

16. The combination with a single-phase system and a substantially balanced polyphase system which may be derived from the single-phase system through the intermediary of a tertiary electromotive force in quadrature relation to the single-phase electromotive force, of means for providing a greatly unbalanced polyphase system, said means including a shunt phase-balancing machine for interconnecting said unbalanced system with said single-phase system and a series phase-balancing machine for interconnecting said unbalanced system with said substantially balanced system.

17. The combination with a single-phase system and a substantially balanced polyphase system which may be derived from the single-phase system through the intermediary of a tertiary electromotive force in quadrature relation to the single-phase electromotive force, of means for providing an unbalanced polyphase system which may be derived from said single-phase system through the intermediary of a tertiary electromotive force substantially half as great as said first-mentioned tertiary electromotive force, said means including a shunt phase-balancing machine for interconnecting said unbalanced system with said single-phase system, a series phase-balancing machine for interconnecting said unbalanced system with said substantially balanced system, and unidirectional exciting means for said phase-balancing machines.

18. The combination with a single-phase system and a substantially balanced polyphase system, of means for providing an unbalanced polyphase system resolvable into a major, forwardly-rotating symmetrical component and a minor, backwardly-rotating symmetrical component of substantially one-half the magnitude of said major component, said means including a shunt phase-balancing machine for interconnecting said unbalanced system with said single-phase system and a series phase-balancing machine for interconnecting said unbalanced system with said substantially balanced system.

19. The combination with a single-phase system and a substantially balanced polyphase system, of means for providing an unbalanced polyphase system resolvable into a major, forwardly-rotating symmetrical component and a minor, backwardly-rotating symmetrical component of substantially one-half the magnitude of said major component, said means including a shunt phase-balancing machine for interconnecting said unbalanced system with said single-phase system, a series phase-balancing machine for interconnecting said unbalanced system with said substantially balanced system, and unidirectional exciting means for said shunt phase-balancing machine.

20. In combination, a single-phase system, a substantially balanced polyphase system, a shunt phase-converter machine coupled to said single-phase system, voltage-distorting coupling means connecting said substantially balanced system to the terminals of said shunt converter machine, a series-phase-balancer machine and means for connecting said series balancer machine in series-circuit relation to said coupling means.

21. In combination, a single-phase system, a substantially balanced polyphase system, a shunt phase-converter machine coupled to said single-phase system, voltage-distorting coupling means connecting said substantially balanced system to the terminals of said shunt converter machine, a series phase-balancer machine, means for connecting said series balancer machine in series-circuit relation to said coupling means, and means for overexciting said shunt converter machine.

22. The method of operating a phase-converting system embodying shunt and series phase-converting machines which consists in, at times, connecting said machines in parallel, and, at other times, connecting the same in series.

23. The method of operating a phase-converting system embodying shunt and series phase-converting machines, for interchanging power between a single-phase system and a polyphase translating device which consists in, at times, utilizing at least one of said converters to convert power at one voltage, and, at other times, connecting said shunt converter to a portion of said single-phase system and connecting said series machine in series between said polyphase translating device, on the one hand, and said shunt machine and additional portions of said single-phase system, on the other, in such manner as to convert power at a higher voltage.

24. The method of supplying an induction motor with three-phase power at different voltages from a single-phase system and shunt and series phase-converting machines, which consists in, at times, connecting said shunt converter directly in parallel to both said system and said motor and connecting said series converter in a parallel path directly in series between said system and said motor, and, at other times, connecting said shunt converter to a portion of said single-phase system and connecting said series machine in series between said motor, on the one hand, and said shunt machine and additional portions of said single-phase system, on the other.

25. The method of supplying an induction motor with three-phase power at different voltages from a single-phase system and shunt and series phase-converting machines which consists in, at times, operating said motor, at reduced voltage, from one of said machines operating alone as a phase-converter, and, at other times, connecting said shunt converter to a portion of said single-phase system and connecting said series machine in series between said motor, on the one hand, and said shunt machine and additional portions of said single-phase system, on the other.

26. The method of operating a phase-converting system embodying shunt and series phase-converting machines, for interchanging power between a single-phase system and a polyphase translating device which consists in, at times, connecting said shunt converter directly in parallel to both said single-phase system and said polyphase translating device and connecting said series converter in a parallel path directly in series between said single-phase system and said polyphase translating device, and, at other times, disconnecting said shunt converter from said single-phase system and operating the same as a synchronous condenser on the polyphase line.

27. The combination with a single-phase system and a polyphase system, of a shunt phase-converter machine, a series phase-converter machine, means for connecting said shunt machine in parallel to both systems and means for connecting said series machine in series between said single-phase system and said polyphase system, said series machine being in an energy-translating path parallel to said shunt machine.

28. The combination with a single-phase system and a three-phase system, of transformer means having three secondary windings of equal voltages associated with said single-phase system, a three-phase shunt converter machine, a three-phase series converter machine, means for connecting said secondary transformer windings in series, means for connecting two terminals of said shunt machine to the intermediate terminals of said series transformer connections, and means for connecting said series machine in series between said three-phase system and the remaining terminals of said shunt machine and series transformer connections.

In testimony whereof, I have hereunto subscribed my name this 18th day of April, 1922.

CHARLES LE G. FORTESCUE.